March 21, 1961  H. W. MOSER ET AL  2,975,706
PRINTER-SLOTTER MACHINES
Filed Oct. 23, 1958  10 Sheets-Sheet 7
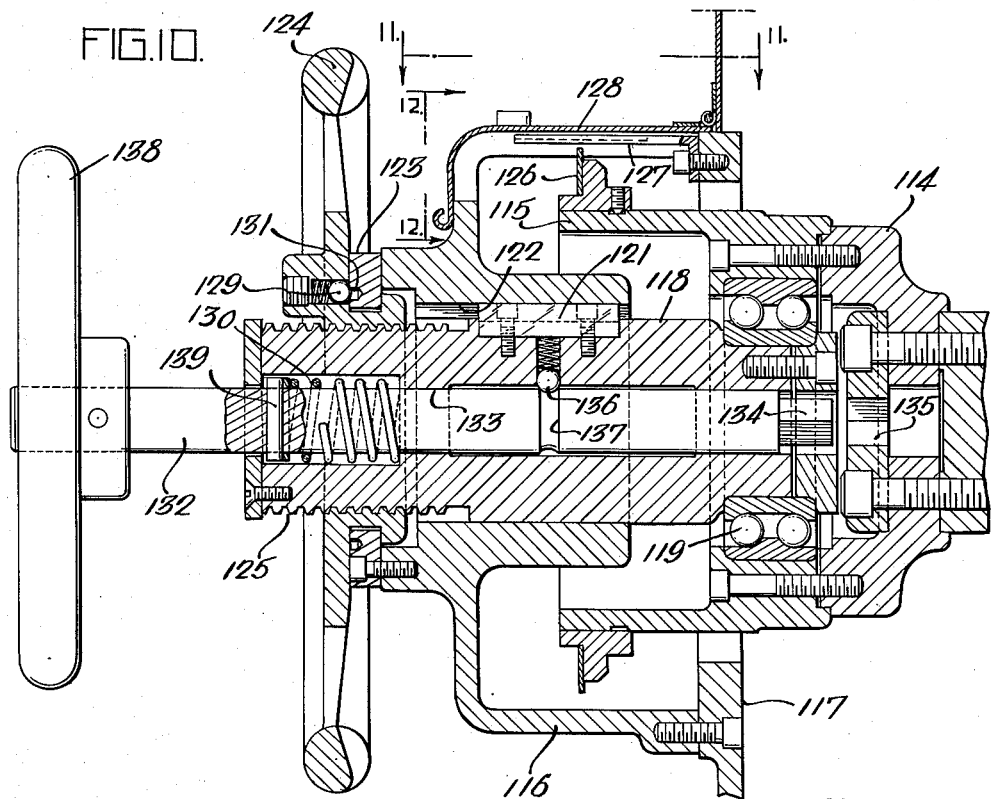
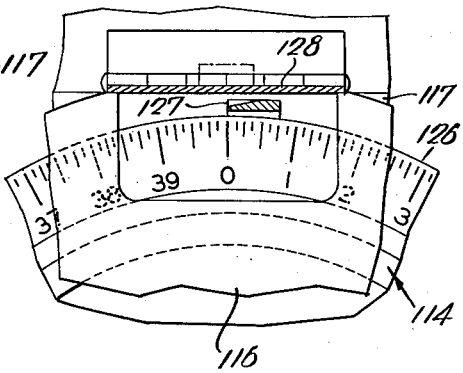
INVENTORS:
HENRY W. MOSER
WILLIAM GROBMAN
EWALD OTTO P. ESKILSON
BY Howson & Howson
ATTYS.

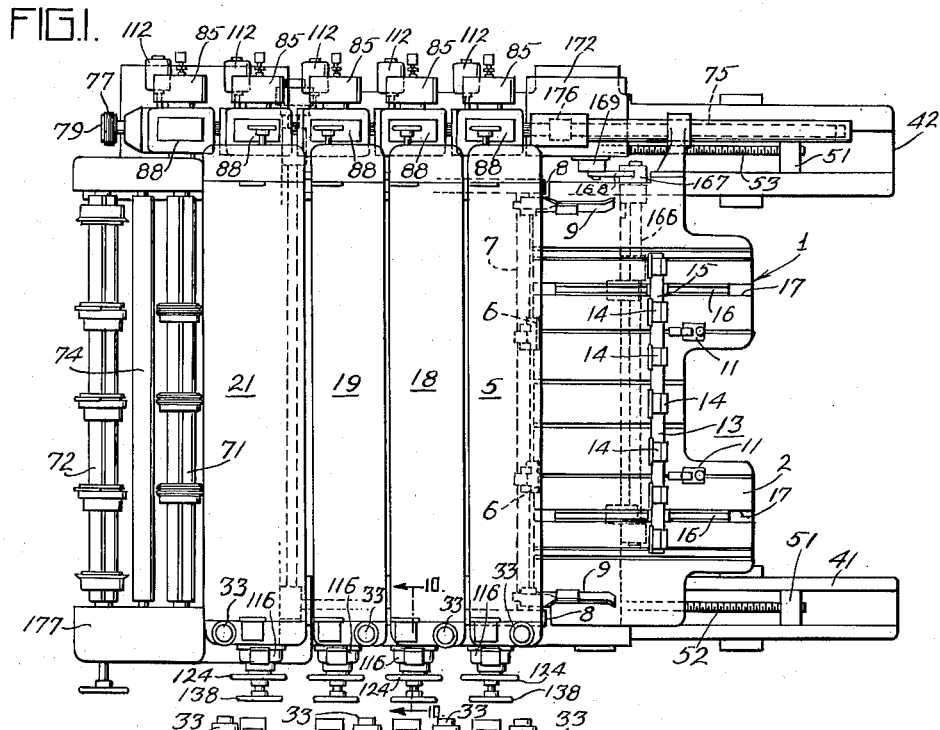
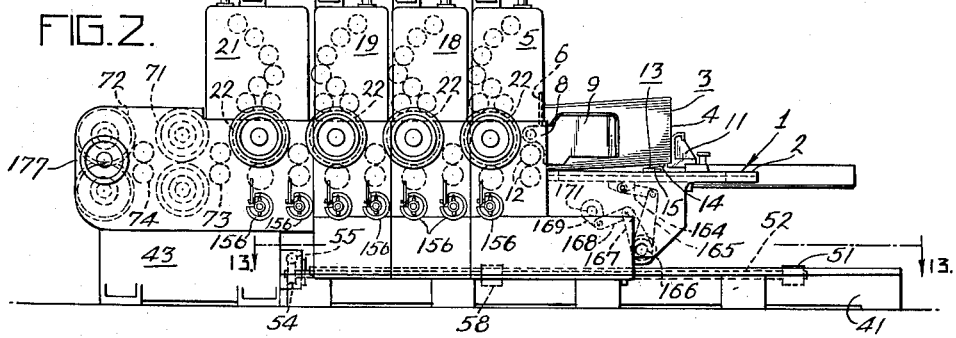
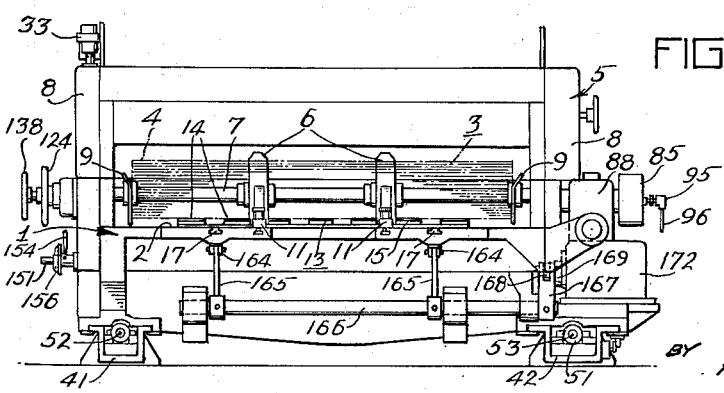
INVENTORS
HENRY W. MOSER
WILLIAM GROBMAN
EWALD OTTO P. ESKILSON
BY Howson & Howson
ATTYS.

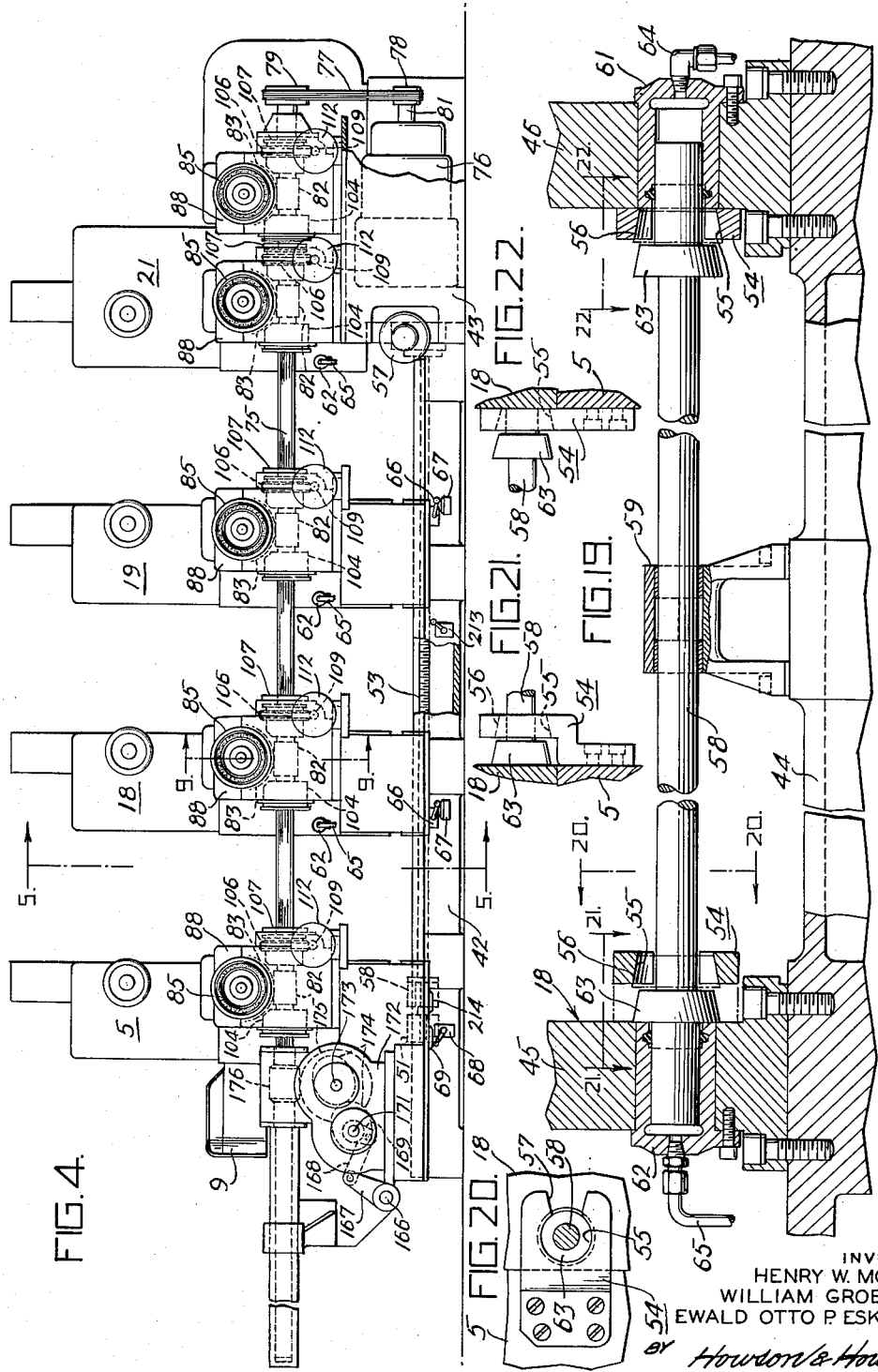

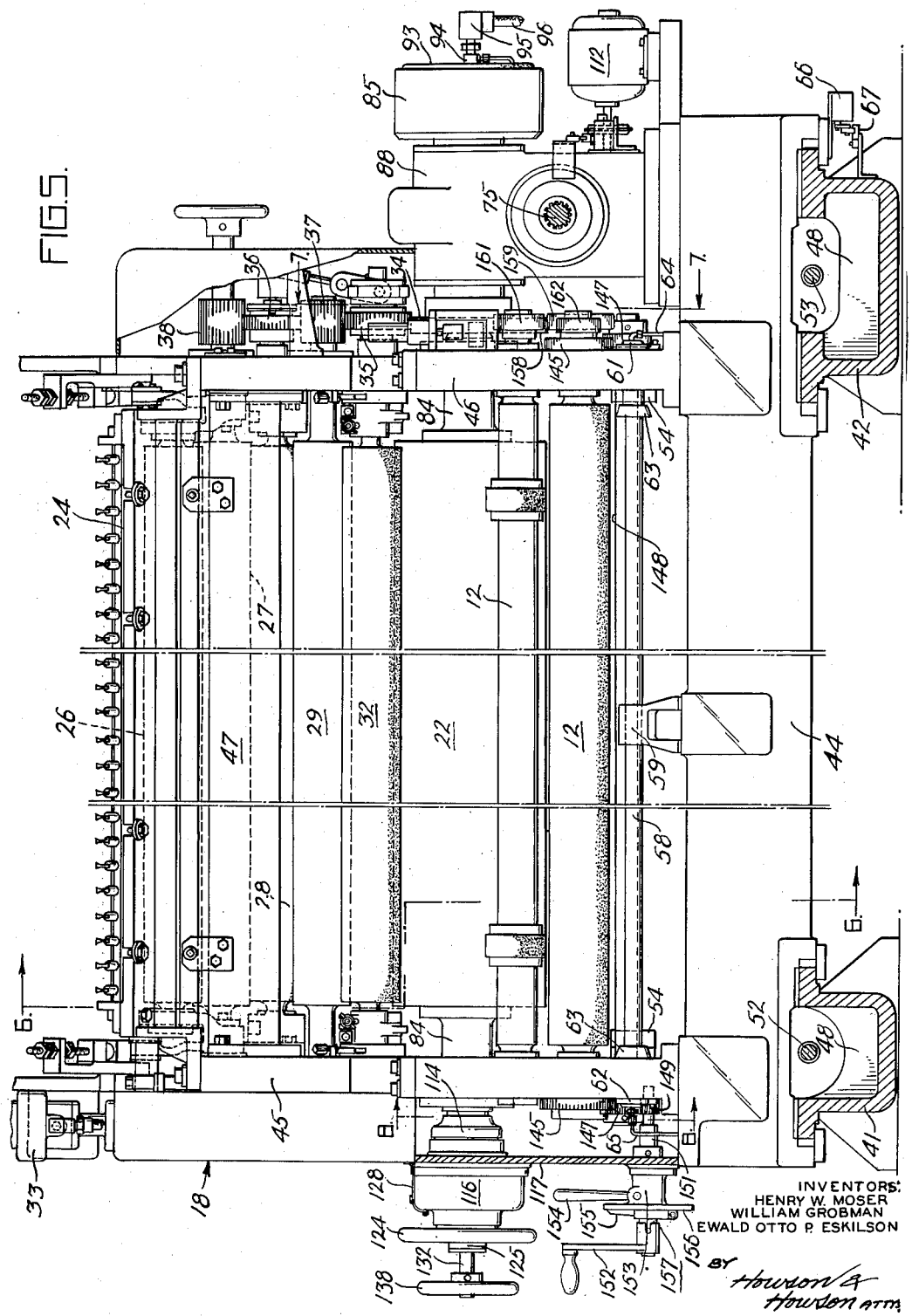

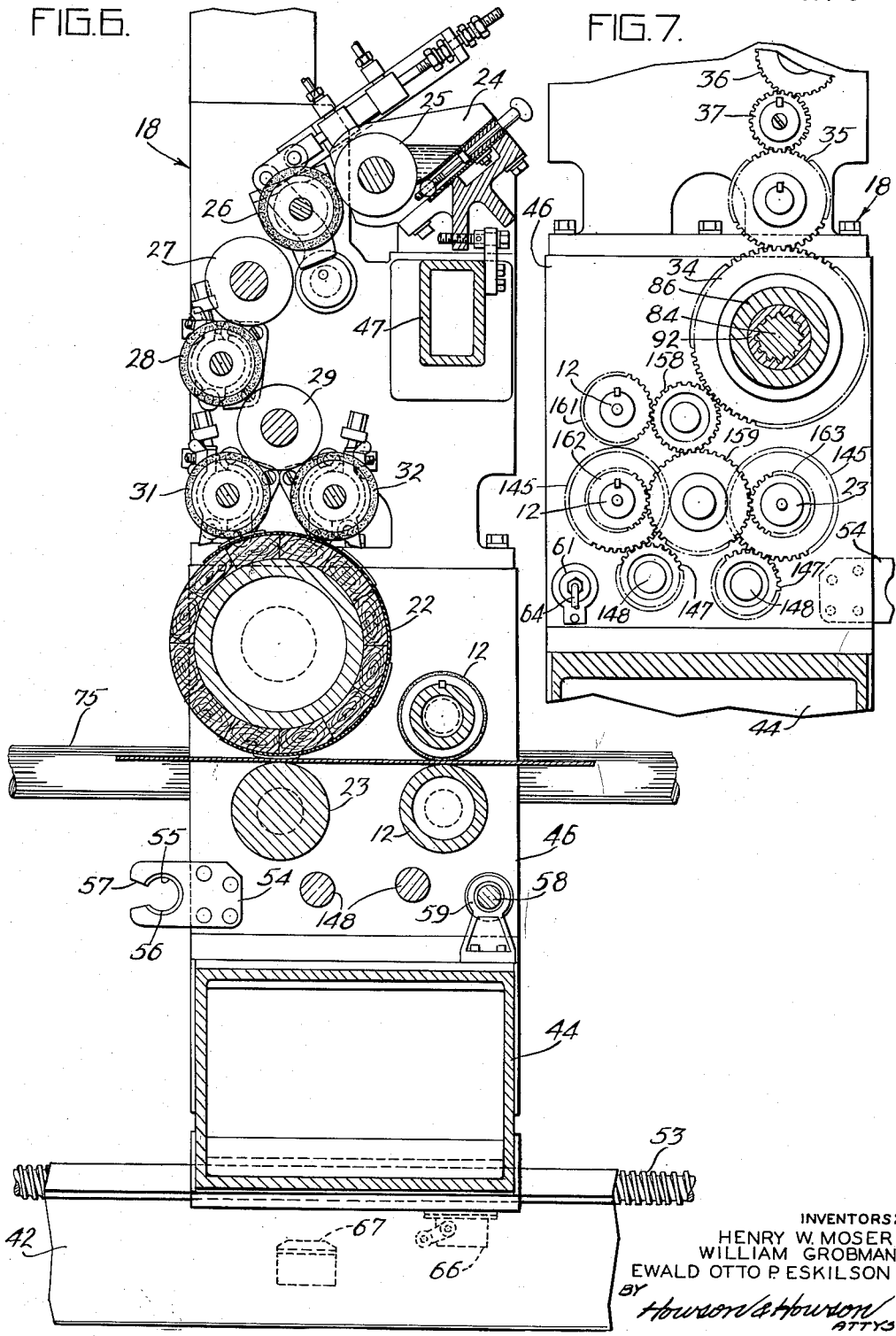

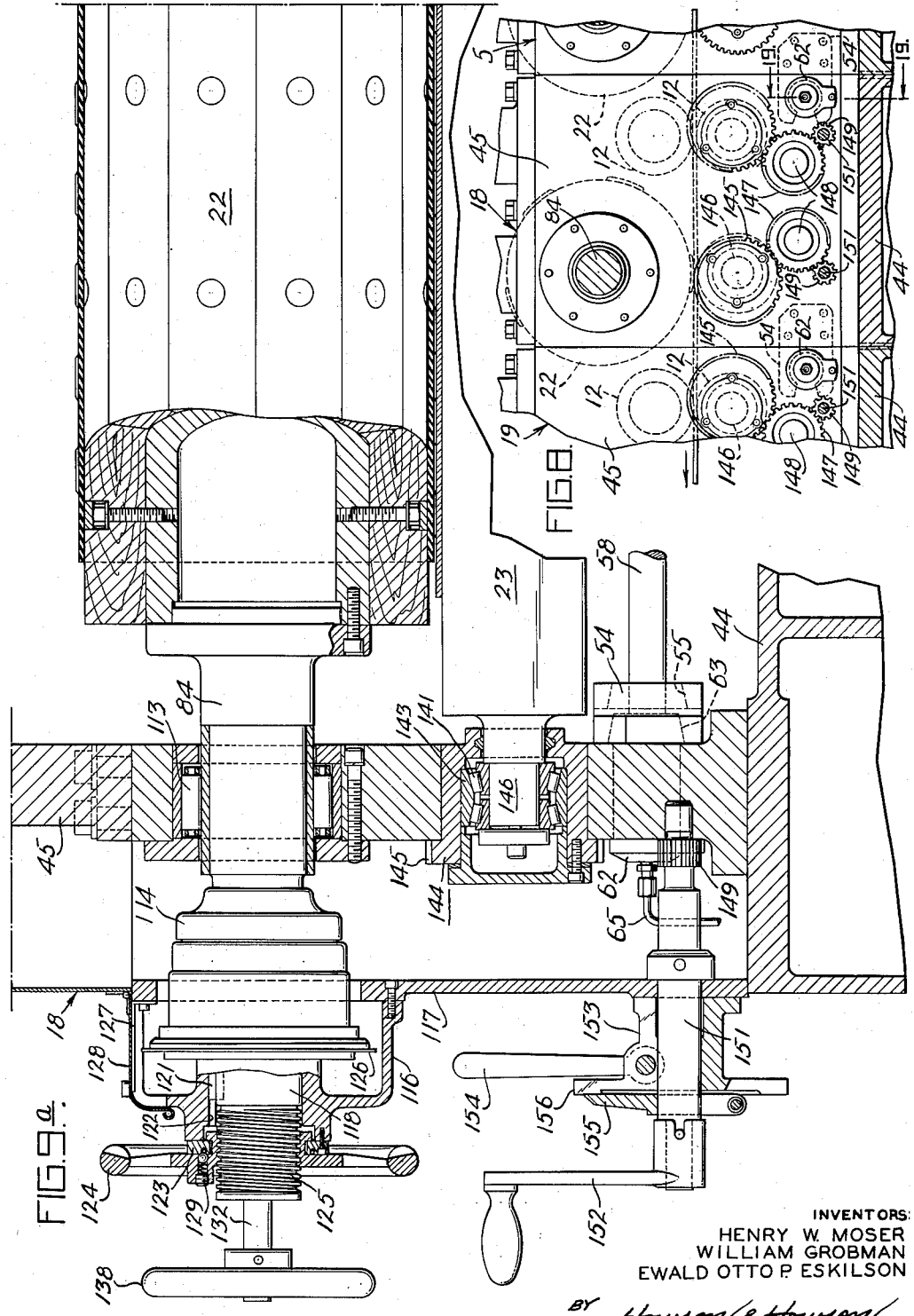

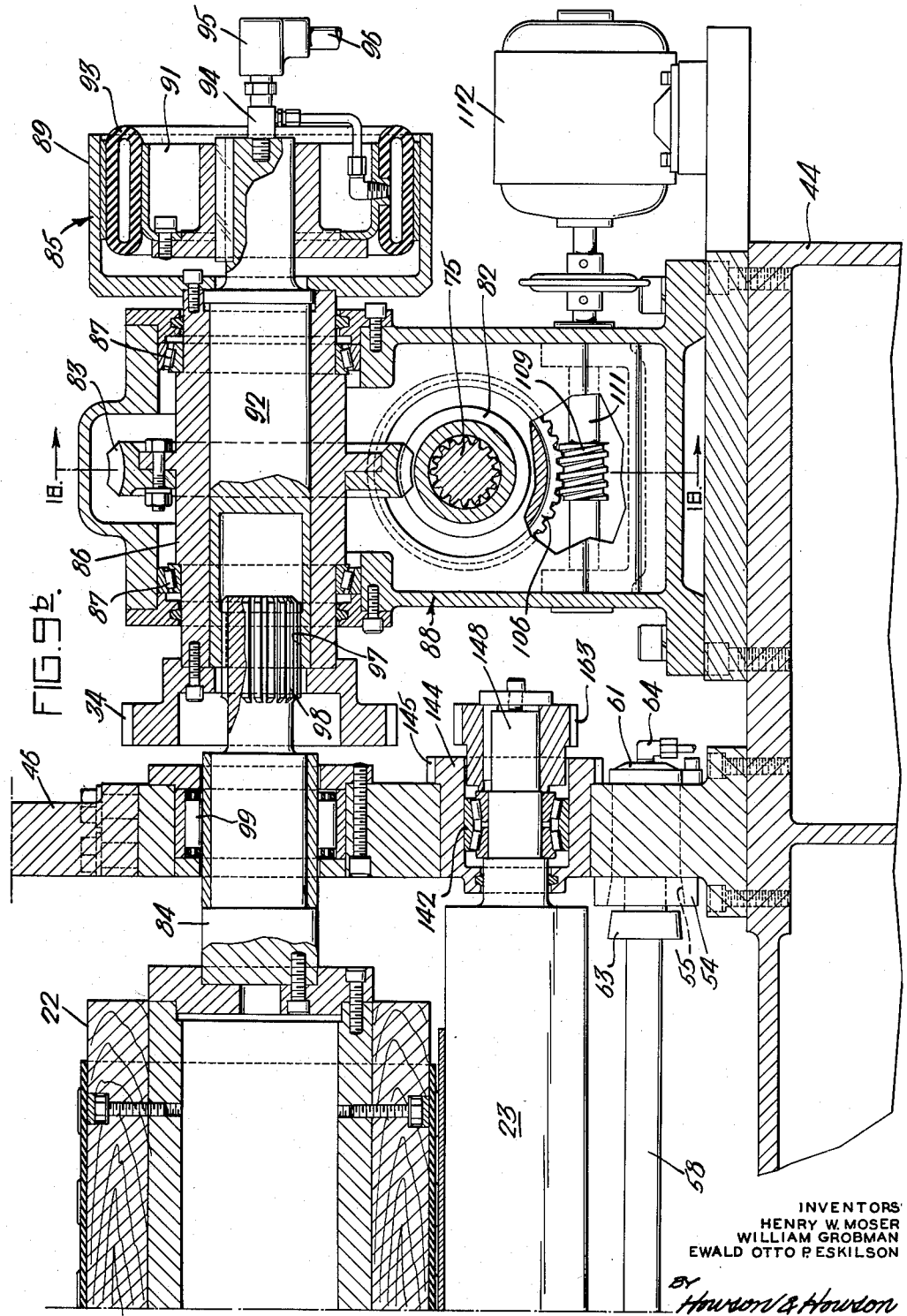

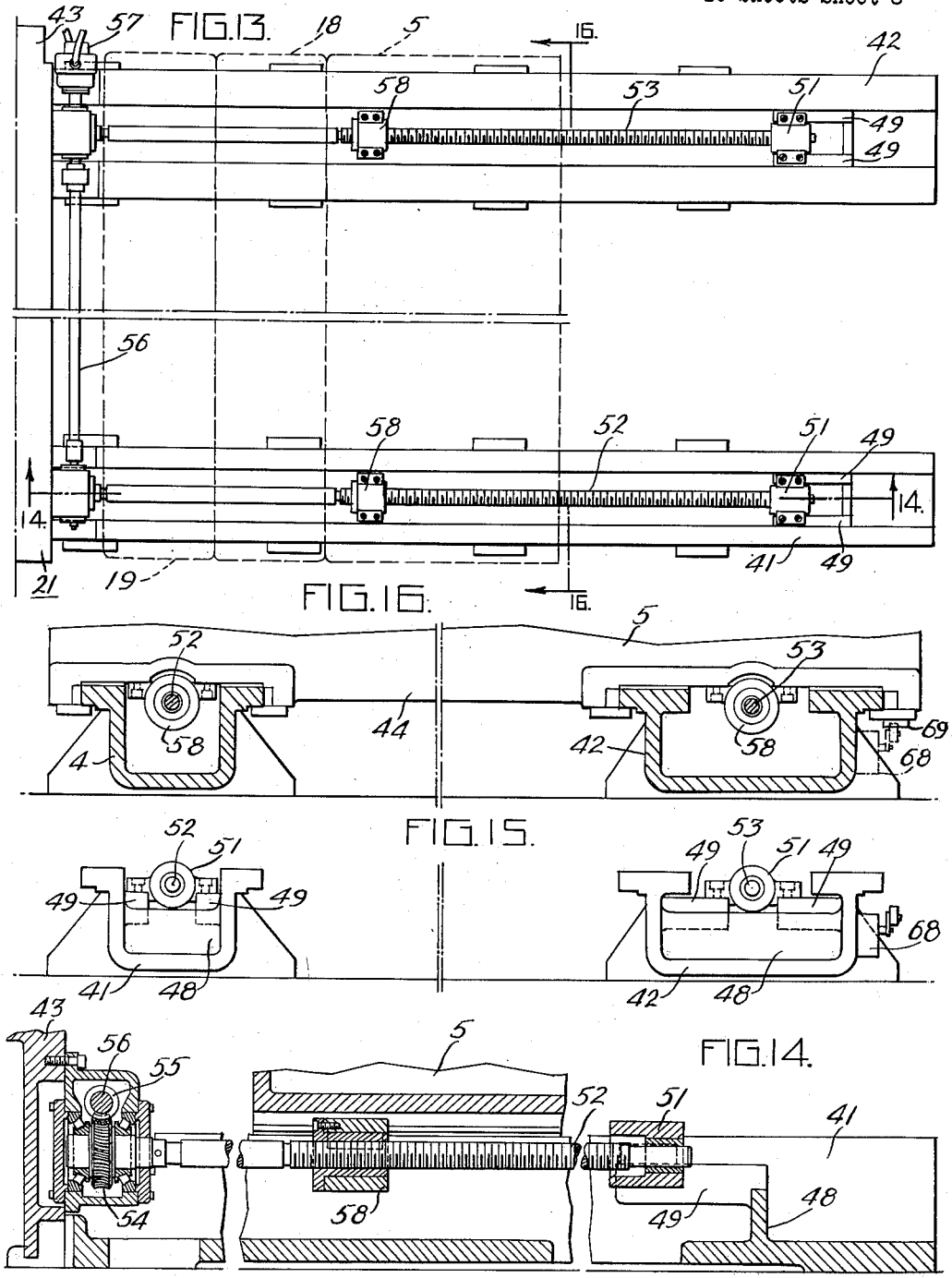

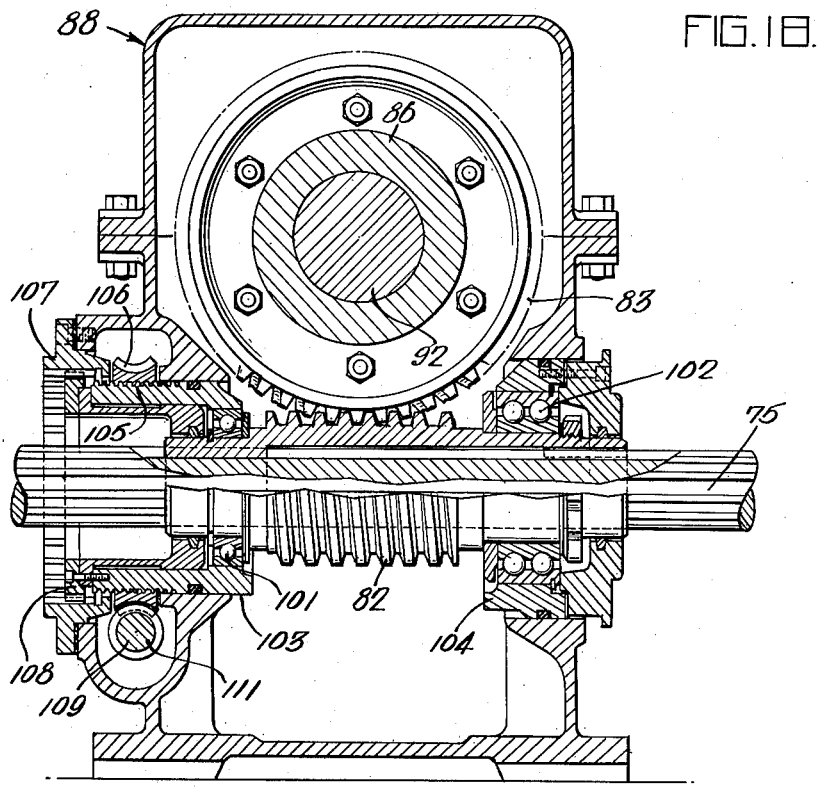
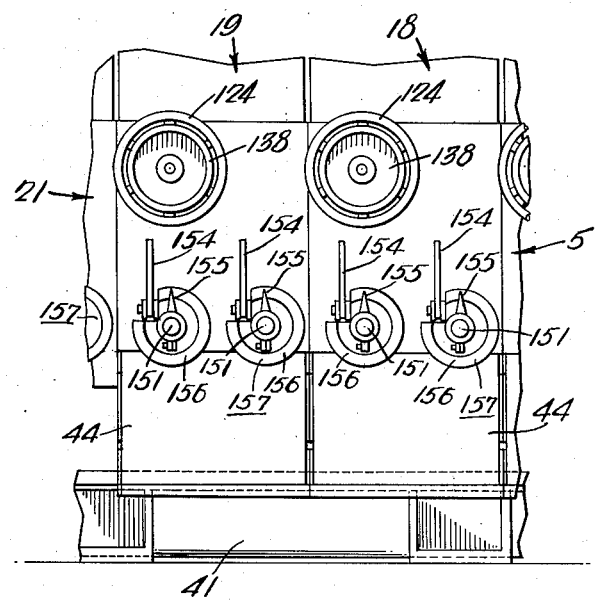
FIG. 18.
FIG. 17.
INVENTORS;
HENRY W. MOSER
WILLIAM GROBMAN
EWALD OTTO P. ESKILSON

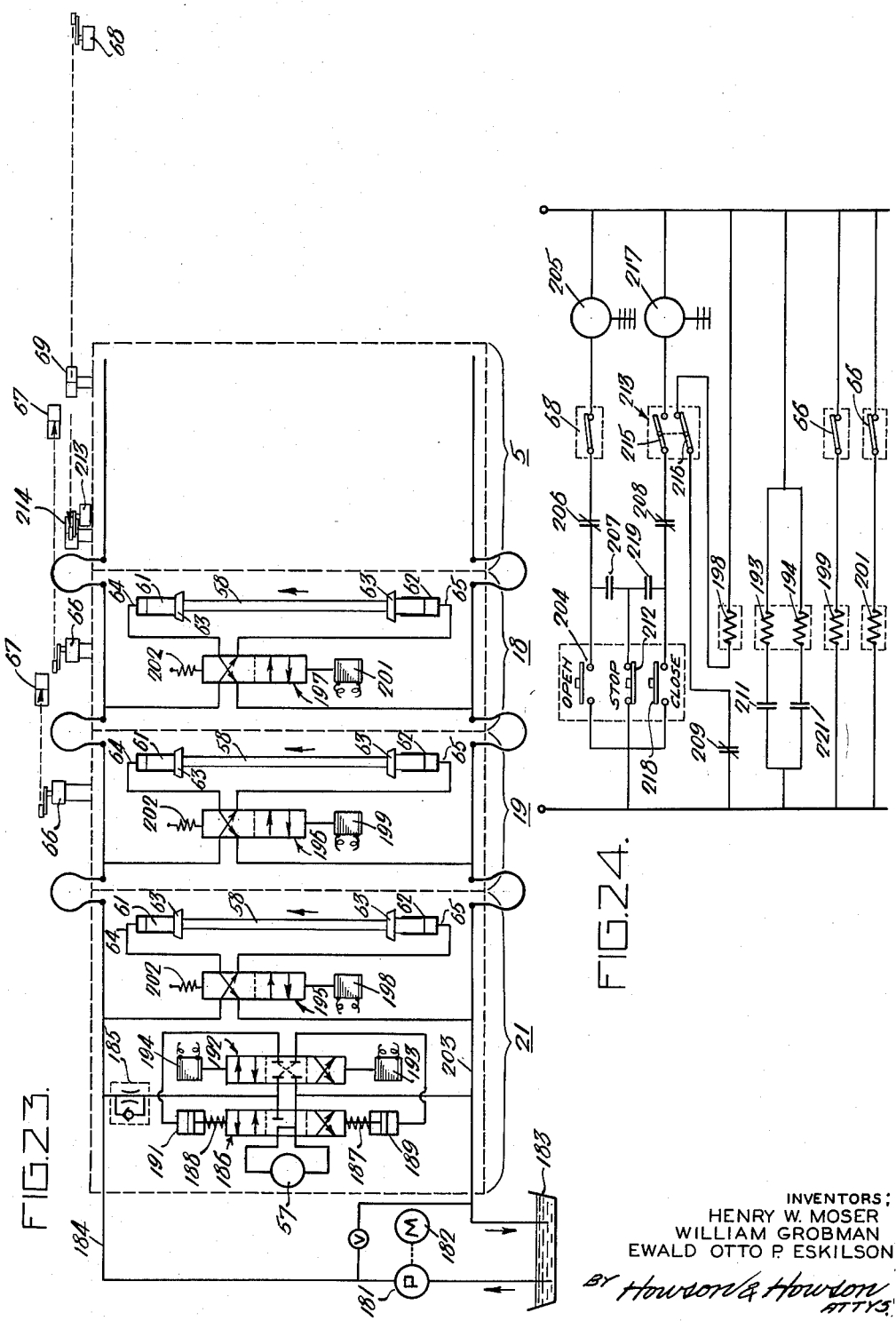

United States Patent Office
2,975,706
Patented Mar. 21, 1961

2,975,706
PRINTER-SLOTTER MACHINES

Henry W. Moser, Haddonfield, N.J., and William Grobman and Ewald Otto P. Eskilson, Philadelphia, Pa., assignors to Samuel M. Langston Company, Camden, N.J., a corporation of New Jersey Filed Oct. 23, 1958, Ser. No. 769,149

15 Claims. (Cl. 101—181)

This invention relates to improvements in "printer-slotter" machines. In these machines, box blanks are first printed and then scored and/or slotted so as to be susceptible to quick and exact folding to the form of the finished box. The invention relates more particularly to machines of this class which comprise a plurality of printing units which operate successively upon the blank as it passes through the machine to provide the desired markings. In the machine the unitary printing mechanisms are arranged serially and in adjacent relation, and provision is made for separating the units so as to afford access to the individual mechanisms for adjustment of the several elements, and for repairs, cleaning and interchange of parts in changeover from one color or character of ink to another, or for substitution of one printing cylinder for another. The precise nature of the unitary inking mechanisms, apart from their unitary nature, forms no part of the present invention, and they are shown as of the character disclosed in the co-pending application of Henry W. Moser, William Grobman, and Ewald Otto P. Eskilson, Serial No. 678,568.

The object of the present invention is to provide an improved machine of the stated character, and the invention resides primarily in certain structural and mechanical features of the machine hereinafter more specifically described.

The invention will be more readily understood by reference to the attached drawings, wherein:

Fig. 1 is a top plan view of a printer-slotter machine made in accordance with the invention;

Fig. 2 is a side elevational view of the machine illustrated in Fig. 1;

Fig. 3 is a front elevational view of the machine, from the infeed end;

Fig. 4 is an enlarged side elevational view of the machine showing the machine opened for access to the several relatively moveable parts thereof by separation of the aforesaid unitary inking mechanisms, or of the separable and relatively moveable elements of the machine, which individually incorporate the aforesaid unitary inking mechanisms;

Fig. 5 is a sectional view on the line 5—5, Fig. 4;

Fig. 6 is a sectional view on the line 6—6, Fig. 5;

Fig. 7 is a sectional view on the line 7—7, Fig. 5;

Fig. 8 is a sectional view on enlarged scale, on the line 8—8, Fig. 5;

Fig. 9–A is an enlarged fragmentary sectional view on line 9—9, Fig. 4, showing one side of the machine;

Fig. 9–B is an enlarged fragmentary sectional view on line 9—9, Fig. 4, showing the opposite side of the machine;

Fig. 10 is an enlarged fragmentary sectional view on the line 10—10, Fig. 1;

Fig. 11 is a sectional view on the line 11—11, Fig. 10, enlarged;

Fig. 12 is a sectional view on an enlarged scale, on the line 12—12, Fig. 10.

Fig. 13 is a sectional view on the line 13—13, Fig. 2.

Fig. 14 is a sectional view on the line 14—14, Fig. 13;

Fig. 15 is an enlarged end view of the base structure of the machine from the right hand end of Fig. 13;

Fig. 16 is a sectional view on an enlarged scale on the line 16—16, Fig. 13;

Fig. 17 is a fragmentary side elevational view on an enlarged scale, showing details of the machine's structure;

Fig. 18 is a sectional view on the line 18—18, Fig. 9–B;

Fig. 19 is a fragmentary sectional view on line 19—19, Fig. 8;

Fig. 20 is a sectional view on the line 20—20, Fig. 19;

Fig. 21 is a sectional view on line 21—21, Fig. 19;

Fig. 22 is a sectional view on the line 22—22, Fig. 19;

Fig. 23 is a diagrammatic view showing the hydraulic system for relatively opening and closing the several sections of the machine, and Fig. 24 is a diagrammatic view of the electrical control system associated with the hydraulic system and affording automatic operation of the system to open and close the sections.

With reference to the drawings, the machine comprises, at the infeed end 1 thereof, a feed table 2 designed to support a stack 3 of box blanks 4. In the present instance this table is formed integrally with a unitary printing section 5 hereinafter described in detail. The forward face of the stack lies against stops 6 mounted on a bar 7 supported at its ends in the side frames 8 of the unit. Also supported on the bar 7 are guide wings 9, 9 which respectively engage the opposite side faces of the stack; and the stack is confined at the back by stops 11 adjustably mounted on the table 2.

The section 5 comprises a pair of feed rolls 12, and the table 2 has means for feeding the blanks 4 from the bottom of the stack 3 successively to these rolls. As an element of this means the stops 11 have the additional function of supporting the rear side of the stack slightly above the surface of the table 2 as shown in Fig. 2 to form a space for operation of pushers indicated generally by the reference numeral 13. These pushers comprise spring fingers 14, see Fig. 2, which when moved rearwardly to a position behind the rear face of the stack spring upwardly so that when again moved forward they will engage the rear edge of the lower most blank of the stack and will slide the blank from under the stack into the nip of the rolls 12. The fingers are mounted on a cross bar 15 which is supported on slides 16 guided in slots 17 in the table 2. Mechanism is provided for reciprocating the slides in the guides in timed relation to the rotary movement of the rolls 12 as hereinafter described.

The machine comprises in the present instance three additional printing units 18, 19 and 21 respectively. As regards the printing mechanism per se these units are essentially identical with the unit 5 and the corresponding elements are accordingly identified by the same reference numerals. As shown in Figs. 5 and 6, each comprises in addition to the feed rolls 12, 12 previously referred to, a printing cylinder 22 and its backing roll 23, an ink reservoir 24 at the top of the unit including a fountain roll 25, a ductor roll 26, and a series of rolls 27, 28, 29, 31 and 32 which, with the ductor and fountain rolls, transfer ink from the reservoir to the printing cylinder. The fountain roll 25 is independently driven by a hydraulic motor 33, Fig. 5, and the rolls 27 and 29 are driven from the cylinder 22 through suitable gearing shown in Figs. 5 and 7 and including a gear 34 connected to the cylinder shaft as hereinafter described, idler gears 35 and 36, and gears 37 and 38 on the shafts of rolls 29 and 27 respectively. The other rolls of the series are driven frictionally from the driven rolls. The details of the ink fountain of the several printing units form no part of the present invention and form the subject of a copending application.

Each of the unitary sections 5, 18 and 19 is mounted for movement bodily on a pair of rails 41 and 42 with respect to each other and to the fixed end section 21. The rails 41 and 42 extend from the base 43 of the section 21 and with the latter constitute the fixed frame of the machine. The several unitary sections 5, 18, 19 and 21 are shown in their normal operative relative positions in Fig. 2, and the sections 5, 18 and 19 are movable on the rails 41 and 42 to the relatively extended and spaced positions shown in Fig. 4. In these latter positions the component elements of the ink-fountains described above, including the printing cylinder and work feed elements are fully exposed and accessible for adjustment, replacement, cleaning and inspection.

As best shown in Figs. 5 and 6 each of the movable sections comprises a transverse base beam 44, and upright side frames 45 and 46 which are rigidly jointed at their upper ends by a cross beam 47. The rails 41 and 42 are generally U-shaped in cross section with transverse reinforcing webs 48 and at the outer end of each inwardly extending lugs 49 which support bearings 51 for transverse screws 52 and 53 which extend longitudinally between the sides of the rails. As shown in Fig. 13 the opposite or inner ends of the screws are connected each through a worm wheel 54, Fig. 14, with a worm 55 on a cross shaft 56, the end of this shaft being connected with a motor 57, Fig. 13, which acts as a driver for simultaneous rotation of the screws. The individual sections are mounted on the rails as shown in Figs. 5 and 16 and the section 5 carries depending nuts 58, Figs. 13, 14 and 16, which engage the screws 52 and 53 respectively so that rotation of the screws may traverse the section on the rails in one direction or the other depending on direction of screw rotation.

Devices are provided for releasably locking the sections in the normal operative positions. These devices take the form of means for anchoring each unit section to the adjoining sections. Thus, the section 19 when in the operative position will be anchored to the fixed section 21; the section 18 to the section 19; and the section 5 to the section 18. These devices are also used to cause the section 5, through the screws 52 and 53 as described above, to draw the sections 18 and 19 into the extended positions shown in Fig. 4. The anchoring devices are identical in character and will therefore be identified by the same reference numerals. Each of the sections 5, 18 and 19 is provided at both sides with a lug 54 which project from the inner sides of the respective side frames beyond the face of the section which lies to the right as viewed in Fig. 4. One of the lugs 54 of the section 18 is shown clearly in Fig. 6. Each of these lugs has an aperture 55 with conical walls 56, and the lug is slotted at its outer end to afford access to the aperture as indicated at 57. Each of the sections 18, 19 and 21 has mounted therein, adjacent the face thereof which as viewed in Fig. 4 lies to the left, a shaft 58, see Fig. 19, the shaft being supported at its midsection in a bearing 59 on the base beam 44 and having its opposite ends supported in fluid pressure cylinders, 61 and 62 respectively, in the side frames 45 and 46. In these cylinders the ends of the shaft act as plungers so that fluid pressure applied in the outer end of either of the cylinders while the other cylinder is open to discharge will result in an axial movement of the shaft in one direction or another depending on which of the cylinders is under pressure. When the sections 5, 18 and 19 are in their relatively closed or operative positions the apertures 55 of the lugs 54 of each section will be in axial alignment with the shaft 58 of the adjoining section and the slots 57 are sufficiently wide to admit the shafts to the apertures as the sections move into the operative positions.

Each of the shafts has at its opposite ends a collar 63 formed to fit the apertures 55 of the lugs 54. When the shaft 58 occupies the position in which it is shown in Fig. 19, the collars 63 are displaced axially from the lugs of the adjoining section, and the sections may then be brought together into operative relation. In this relation the lug apertures and the shaft will be in axial alignment and movement of the shaft to the right as viewed in Fig. 19 will then cause the tapered collars to enter the apertures 55 to draw the sections securely together and to lock them positively against relative movement. The cylinders 61 and 62 can be selectively connected to a source of fluid pressure and to discharge through pipes 64 and 65 respectively.

The aforedescribed locking means, in addition to holding the sections together in the operative position, function also to permit the section 5 to draw the sections 18 and 19 to their extended positions shown in Fig. 4. When the sections are to be so extended the shaft 58 of section 21 is actuated to release the lugs 54 of section 19 so that the sections 5, 18 and 19 may move together as a unit, under propulsion of section 5 and actuating screws 52 and 53, away from the stationary section. When the sections 5, 18 and 19 have advanced as a unit to a point where the section 19 is in a fully extended position, a micro switch 66 on that section is actuated by a fixed cam 67 on the base 42 to admit pressure fluid to cylinder 61 of section 19 and simultaneously to open cylinder 62 of the same section to discharge with the result that the associated shaft 58 is moved to displace the collars 63 from the lugs 56 of section 18 and thereby to free section 19 from section 18 and to permit the sections 5 and 18 to continue their movement of retraction without section 19. A similar cam actuated switch 66, 67 is associated with section 18 to automatically free that section from section 5; and a switch 68 on the base 42 is located in the path of a cam 69 on section 5 for actuation by the cam when that section has reached the fully extended position to interrupt to retractive movement of the section by cutting off flow of activating fluid to the fluid motor 57 driving the traverse screws 52 and 53.

When the sections are to be closed together, the motor 57 is reactuated in the reverse direction to traverse the section 5 to the right as viewed in Fig. 4, the section 5 picking up the sections 18 and 19 in succession and eventually bringing the movable sections into the closed positions of Figs. 1 and 2. The aforedescribed anchoring means may be actuated manually to secure the sections in the closed positions or they may be actuated automatically as desired.

The fixed terminal section 21 comprises in addition to the printing mechanism, indicated in broken lines in Fig. 2 and described above, blank scoring and slitting couples indicated respectively by the reference numerals 71 and 72, Figs. 1 and 2. Each of these couples receives the printed blanks from the printing roll 22 of section 21 through the medium of feed rolls 73 and 74 of the same character as the feed rolls 12 illustrated in Fig. 5. The couples 71 and 72 and the feed rolls 73 and 74 are driven in synchronism with the printing mechanisms as described below.

Extending the full length of the machine is a splined shaft 27. This shaft finds journal support in each of the sections 5, 18, 19 and 21 as hereinafter described and is driven by a motor 76 in the base of section 21, see Fig. 4, through a chain 77 and sprockets 78 and 79 on the motor shaft 81 and on the end of shaft 75 respectively. The shaft 75 is connected to each of the pointing sections through the medium of a worm 82 on the shaft and a worm wheel 83 operatively connected to the shaft 84 of the printing cylinder 22. The operative connection, which includes a clutch 85 is best shown in Fig. 9B. The worm wheel 83 is attached to a sleeve 86 journaled in bearings 87 in a housing 88 on an extension of the base 44 of the section. At one end the sleeve carries the outer member 89 of the clutch 85, and the inner clutch member 91 is keyed to a stub shaft 92 which is journaled in the sleeve 86. The inner and outer clutch members are operatively engaged and disengaged by inflation and deflation respectively of an interposed flexible tube 93. Such inflation and deflation may be effected selectively through a fitting 94 in the end of the shaft 92 having a rotative connection with a relatively fixed terminal fitting 95 on tube 96 extending to a suitable source of fluid pressure. At the opposite end of the sleeve 86 is the gear 34. The shaft 92 has, at the opposite end thereof from the clutch 85, a splined bore 97 which receives the correspondingly splined end 98 of the cylinder shaft or trunnion 84 which, as shown, is journaled in a bearing 99 in the side frame 46 of the section.

When the clutch 85 is engaged the worm wheel 83 will have driving connection with the cylinder 22; and when the clutch is disengaged the shaft 92 and the cylinder will be free to turn about the common axis independently of the worm wheel, and the driving connection will be broken.

Means is provided in association with the worms 82 and their wheels 83 for adjusting the angular relation, individually, between the cylinders and the common drive shaft 75 to obtain exact registration between the several printing cylinders. This adjusting means is illustrated in Figs. 9-B and 18. The worm 82 in each case is adjustable axially of the shaft 75 and to this end is journaled in bearings 101 and 102 mounted in sleeves 103 and 104 respectively which are slidably supported for axial movement in the housing 88. The sleeve 103 threaded, as indicated at 105 in Fig. 18, and these threads are engaged by an adjusting nut in the form of a worm wheel 106. This wheel is confined axially between shoulders on the housing proper and on a flange 107 secured to the housing and splined internally for engagement with an externally splined flange 108 secured to the outer end of the sleeve 103. This splined connection prevents the sleeve 103 from turning but permits axial adjustment of the sleeve and with it of the sleeve 104 and worm 82. It will be apparent that such axial adjustment of the worm will cause a corresponding angular adjustment of the worm wheel 83 and that with the clutch 85 engaged the angular movement of the said wheel will be transmitted to the cylinder 22.

With further reference to Figs. 9-B and 18, it will be noted that the worm wheel adjusting nut 106 is engaged by a worm 109 on a shaft 111 journaled in the housing 88, and that this shaft is driven by a motor 112 mounted on the base 44 and coupled to the said shaft. Each of the printing sections is provided with this motor and with the associated means for individually adjusting the angular relation between the printing cylinder 22 of the section and the common drive shaft 75. Thus, the several cylinders by operation of the motors 112 may be brought into registry with each other, and the common splined drive shaft 75 maintains this registry while still permitting the opening and closing movements of the units described above.

Means is also provided for manual adjustments of the individual printing cylinders both angularly and axially independently of the adjustment means described above. As shown in Figs. 9-A and 10 one end of each of the cylinders is supported in a bearing 113 in the side frame 45 of its particular section. This end of the cylinder shaft 84 carries a housing 114 the open outer end 115 of which is embraced by a housing 116 secured to a fixed wall 117 of a casing on the said section. Slidably supported in the housing 116 in axial alignment with cylinder shaft 84 is a member 118 the inner end of which forms a mount for a bearing 119. The inner and outer race rings of this bearing are axially confined in the member 118 and in the housing 114 and the bearing functions in part to secure the member 118 to the housing for joint movements axially while permitting relative rotation. A key 121 on the member 118 fits a slot 122 in the housing 116 to preclude rotation of the said member. Rotatably attached to the housing 116 through the medium of a split ring 123 is a hand wheel 124 having an annular hub embracing the outer end portion of member 118 and threaded internally for engagement with corresponding threads 125 on the member. With this threaded connection, rotation of the wheel effects an axial movement of the member 118 and of the cylinder 22 to which the said member is connected through the bearing 119 and housing 114. A flat ring 126 on the housing 114 cooperates with a scale 127 secured to the wall 117 to afford a visible index of the position axially of the cylinder and of the extent to which the cylinder is adjusted axially by any angular movement of the hand wheel. Visible access to the scale and ring is had by elevating a normally closed hinged cover 128. The wheel 124 is releasably held in adjusted position by a spring pressed ball detent 129 which engages in recesses 131 in ring 123.

A cylindrical shaft 132 is mounted in the bore 133 of member 118. The shaft is free to rotate and can be adjusted axially in the bore, and has a squared terminal end 134 which fits a corresponding socket 135 in the inner end of housing 114. A spring detent 136 engages a circumferential groove 137 in the shaft to hold the shaft normally in retracted position as shown in Fig. 10. Through a hand wheel 138 on its outer end, the shaft may be moved axially to engage the end 134 in the socket 135 and may then be turned to rotate the housing 114 and the cylinder 22, the clutch 85 being disengaged to permit such manual rotation. When the hand wheel 138 is released, a spring 130 acts to return the shaft to retracted position as shown in Fig. 10. The aforedescribed axial adjustments of the cylinder through hand wheel 124 are permitted by the splined connection between the opposite end of the shaft 84 and the axially fixed shaft 92. The indicator ring 126 bears a scale as shown in Fig. 12 which, in cooperation with the scale 127 affords indication of the angular position of the cylinder with reference to a selected zero point. The shaft 132 is positively confined to the member 118 by a stop pin 139.

The backing rolls 23 of the printing cylinders are mounted in bearings 141 and 142 in the side frames 45 and 46, respectively, of the respective sections. As shown in Figs. 8 and 9-A the outer face ring 143 of the bearing 141 is mounted in a sleeve 144 which is rotatively supported in the side frame, and which may be rotated through the medium of a gear 145 formed on the outer end of the sleeve. Rotation of the sleeve also rotates the race ring 143. The bore of the sleeve is eccentric to its outer cylindrical surface so that rotation of the sleeve has the effect of radially displacing the trunnion 146 of the roll. The gear 145 meshes with an idler gear 147, Fig. 8, fixed to a shaft 148 which extends across the section and is journaled in the side frames 45 and 46. The gear 147 is engaged by a pinion 149 on a shaft 151 journaled in the side frame and in the wall 117 as shown in Fig. 9-A. Rotation of the shaft 151 by detachable handle 152 will effect an angular adjustment of the eccentric sleeve 144 and a consequent radial adjustment of the trunnion 146. A corresponding adjustable eccentric mount is provided for the bearing 142 at the opposite end of the roll and the sleeve 144 of this mount is similarly geared to the shaft 148 so that the afore-described rotation of the shaft adjusts the roll 23 radially with respect to the cylinder 22. The shaft 151 may be clamped in adjusted position by drawing up split sleeve 153 by means of a lever 154. The angular position of the shaft is indicated by a pointer 155 on the shaft and a relatively fixed graduated dial 156 on the outer end of the clamping sleeve 153. The device provides adjustment of the backing rolls of the several cylinders to suit blanks of different thickness. A corresponding device is provided for relative adjustment of the feed rolls 12 as indicated generally by the reference numeral 157 and the individual elements of the device are identified by the same reference numeral used on the corresponding elements of the adjusting means for the backing rolls 23. Thus, Fig. 5 shows the shaft 148 which carries the gears 147 at its end which mesh with the gears 145 of the sleeves 144. Figs. 5 and 7 show also the manner in which driving connection is established in each of the printing sections between the gear 34 of the printing cylinder and the backing roll 23 and feed rolls 12. This connection includes idler gears 158 and 159 which respectively engage gears 161 and 162 on the shafts of the upper and lower feed rolls 12, and which also mesh with each other. The gear 159 also engages gear 163 on the shaft of backing roll 23.

As described above, the splined shaft 75 constitutes a common drive for the printing mechanisms of all of the unitary sections, and maintains the mechanisms in phase regardless of the relative positions of the sections. This common drive extends also to the blank feeding devices associated with the section 5 as described above, and to the scoring and slitting devices associated with the fixed section 21. Thus, the elements 16 of the blank feed are connected through links 164, Fig. 2, with arms 165 on a rock shaft 166 journaled on the frame of section 5 as shown in Fig. 3, and this shaft is connected through an arm 167 and link 168 with a crank 169 on a shaft 171 journaled in a housing 172 in the said section. The shaft 171 is connected to a second shaft 173 in the housing by elliptical gears 174 indicated in broken lines in Fig. 4, and shaft 173 carries a worm wheel 175 which engages a worm 176 splined to the shaft 75. The blank feeding fingers 14 are thus reciprocated with quick feed and slow return motions from the shaft 75, in synchronism with the operations of the printing mechanisms and feed rolls 12.

The elements of the scoring and slitting mechanism, including the feed rolls 73 and 74 are similarly connected to the shaft 75 by way of transmission means similar to that connecting the shaft with the cylinders of the several printing mechanisms and described above. This connection including the worm 82 splined to the shaft and the complementary worm wheel 83, see Fig. 4, which is connected through fluid clutch 85 to the shaft, in this instance, of the upper scoring roll 71. The other elements of the scoring and slitting means are operatively connected by suitable transmission means, not shown, contained within the housing 177.

It will be understood that the fluid pressure connection to the cylinders 61 and 62 of the unit section locking means will be connected to the source of pressure at least in part by flexible conduits affording freedom for adjusting the sections as described above. It will be noted also that the motors 112 for axially adjusting the worms 82 as described afford a means for changing the angular relation of the individual printing cylinder to the common drive shaft 75 while the machine is in operation for registration of the several printing cylinders with each other.

As indicated, the invention contemplates automatic opening and closing of the units, and Figs. 23 and 24 show, respectively a hydraulic system and an associated electrical control circuit for that purpose. The hydraulic system comprises a pump 181 which is driven by a motor 182. The pump draws hydraulic fluid from a sump 183 and forces into pressure line 184. From this line pressure fluid is admitted through a constant volume orifice 185 to reversible motor 57 which drives the traverse screws 52 and 53 as previously described. The direction of rotation of motor 57 is controlled by a hydraulically-actuated reversing valve 186, this valve normally occupying a neutral position by action of springs 187, 188 in which position the motor is disconnected from the pressure line and is idle. When pressure fluid is admitted to valve-actuating cylinder 189, the valve is adjusted to connect one side of the motor to the pressure line, and when pressure fluid is admitted to valve-actuating cylinder 191, the valve is adjusted in the opposite direction to connect the other side of the motor to the pressure line.

An electrically actuated valve 192 controls the admission of pressure selectively to the cylinders 189 and 191. Normally this valve occupies a neutral position as shown in Fig. 24. When solenoid 193 is energized the valve 192 is adjusted to admit pressure fluid from line 184 to cylinder 189; and when solenoid 194 is energized the pressure fluid is admitted to cylinder 191.

The admission and exhaust of pressure fluid to the cylinders 61 and 62 of the several unit latching devices is controlled by solenoid actuated valves 195, 196 and 197, respectively. The solenoids 198, 199 and 201 of these valves are normally energized, and when energized act to hold the valves in the positions shown in Fig. 23, wherein they connect the pressure line 184 with the cylinder 62 of the associated latch 58, thereby holding the latches in the advanced or operative positions. When the solenoids are de-energized, the valves are adjusted by the springs 202 to admit pressure fluid to the cylinders 61 to retract the latches. In each case, when one of the cylinders, 61 or 62 as the case may be, is connected to the pressure line 184, the other cylinder is connected through the valve to exhaust line 203 connected directly to the sump 183 as shown.

Referring now to Fig. 24, let it be assumed that the unit sections are locked up in the closed positions as indicated diagrammatically in Fig. 23, and that it be desired to open the sections as described. The electrical control circuit will then be as shown in Fig. 24. Manual closing of unit opening switch 204 will energize relay 205 through a normally closed switch 206 and limit switch 68 of unit section 5 which now also is closed. Operatively connected with relay 205 are switches 207, 208, 209 and 211. Energization of the relay closes switch 207 which makes a holding circuit through closed stop switch 212 for the relay. Energization of the relay also opens switches 208 and 209 and closes switch 211. Opening of switch 209 de-energizes solenoid 198 of latch control valve 195, and opens the latch on unit section 21 to release section 19. Closing of switch 211 energizes solenoid 193 of valve 192 controlling traverse motor 57 and admits pressure fluid to cylinder 191 to connect one side of motor 57 to pressure line 184 and the other side to discharge line 203. The motor is then driven to move the unit sections 5, 18 and 19 away from section 21. As this movement continues, limit switch 66 of unit 19 engages its cam 67 and opens the switch to de-energize solenoid 199 which has the effect of actuating valve 196 to release latch 58 and to thereby detach section 19 from section 18. Continued movement of sections 5 and 18 brings limit switch 66 of the latter section into contact with its actuating cam 67 and opens the switch to de-energize solenoid 201, thereby actuating valve 197 to release the associated latch 58 and to detach section 18 from section 5. The latter section will continue its movement until limit switch 68 engages cam 69 to open the switch, thereby de-energizing relay 205 and reopening switch 211 to de-energize solenoid 193. Valve 192 then returns to the neutral position, and permits valve 187 to return also to neutral position by action of spring 188. The traverse movement is thereby interrupted with the units in open positions. Switches 208 and 209 reclose, and switch 207 reopens.

Carried by unit section 5 is a double pole switch 213 which, when the section is in the fully closed position, is engaged by a cam 214. The pole 215 is normally closed, and the pole 216 is normally open. The cam 214 actuates the switch to open pole 215 and close pole 216 as shown in Fig. 24. The pole 215 controls a circuit containing the switch 208, a relay 217, and the closing switch 218. When it is desired to close the unit sections, this switch 218 is closed manually and, since switches 208 and 215 are now also closed, the latter by reason of the fact that the section 5 is in open position, the relay 217 is thus energized. Connected to the relay 217 is a switch 219 which is closed by the relay when energized to make a holding circuit through stop switch 212. Also connected to relay 217 is the switch 206 which, when opened by energization of the relay breaks the circuit of relay 205 which precludes energization of the latter relay until relay 217 has been energized. The switch 208 performs the same function in the circuit of relay 217. The relay 217 is also connected to a switch 221 which, when closed by energization of the relay, energizes solenoid 194 to restart traverse motor 57, but this time in the reverse or closing direction. The circuit of solenoid 198 is broken by reason of the fact that the switch pole 216 is now open, as described above, so that the solenoid is de-energized; and, since the switches 66 of the unit sections 18 and 19 are also being held open by their respective cams, the solenoids 199 and 201 are also de-energized. The valves 195, 196 and 197, under force of the springs 202 are therefore in the positions in which pressure is applied to latch cylinders 61 and pressure fluid is exhausted from cylinders 62, so that the latches are retracted and in the inoperative positions. The section 5 in its closing movement first contacts the section 18 and begins to advance that section toward the closed position. The immediate result is to shift the switch 66 of section 18 from its cam 67, thereby closing the switch and energizing solenoid 201 which then shifts valve 197 to the latch-closing position and latches the section 18 to section 5. Section 18 then engages section 19, and the latter section is similarly latched to section 18. The closing movement then continues until section 19 is closed with fixed section 21, and at this point switch 213 engages cam 214 and is shifted to open the circuit of relay 217 and to close the circuit of solenoid 198. The resulting de-energization of relay 217 opens switch 221 to de-energize solenoid 194, returning valve 192 to neutral position and interrupting operation of motor 57. The traverse movement of the unit sections is thus terminated. The closing of pole 216 of switch 213 also energizes solenoid 198 to close the latch, locking the section 19 to section 21. The sections are now in fully closed and locked-up condition and the machine is in condition for normal operation.

It will be apparent that the opening and closing movements may be terminated at any desired point by opening stop switch 212. It will be understood also that the automatic operation described above is not preclusive of the usual manual controls for shifting the sections either together or individually as desired.

There may be considerable modification of the aforedescribed machine without departure from the invention. It is possible, for example, to eliminate the devices for latching the unit section 19 to the section 21, with considerable resultant simplification in mechanism and in the control system. In such case the traverse screws 52 and 53 are depended upon to retain the sections in the relatively closed positions as well as in the open positions. It is possible also, without departing from the principle of the invention, to divorce the slotting and scoring mechanisms from the printing mechanism in the final section 21, and to include the former mechanisms in a separate, independently traversible section.

It should be noted particularly that the transmission means which connects the mechanisms of the several unit sections to the common power source is such as to make possible the adjustment of the sections individually with respect to each other, and collectively with respect to the relatively fixed base unit without affecting the setting or synchronized relation of unitary mechanisms, and provides also for operation of all of the said mechanisms together, or each individually, in the fully closed and fully open positions and in any intermediate position.

We claim:

1. In a rotary printing machine of the multi-impression type comprising a plurality of printing couples arranged serially in the path of travel of the work and an inking apparatus operatively associated with each of the couples and forming with the latter a unit printing mechanism, together with means for adjusting said units between relatively closed positions in which the said units lie contiguous to each other and relatively extended positions in which the said units are spaced apart on said path, drive means for said mechanisms consisting of a rotary splined shaft paralleling said path of travel and means for connecting each of said unit mechanisms to the shaft including a first gear element splined to and axially movable on the shaft, a hollow sleeve journaled in the unit and having thereon a gear element meshing with said first gear element, a stub shaft journaled in said hollow sleeve, a clutch releasably connecting said stub shaft and hollow sleeve, and means for coupling the stub shaft to the said mechanism.

2. A rotary printing machine according to claim 1, wherein the stub shaft is connected by the coupling to the printing cylinder of the said mechanism.

3. A rotary printing machine according to claim 2, wherein the coupling comprises a splined connection between the stub shaft and the cylinder affording freedom for axial adjustment of the latter.

4. A rotary printing machine according to claim 3, including means for axially adjusting the cylinder.

5. A rotary printing machine according to claim 4, wherein the adjusting means comprises a threaded sleeve supported in the unit in axial alignment with the cylinder and adjustable axially of the latter, means for preventing rotation of the member about said axis, rotary connecting means for the member and cylinder, an adjusting nut engaging the threads of said sleeve, and means for turning the nut to axially adjust the member in the unit.

6. A rotary printing mechanism according to claim 5, including a wrench slidably mounted in said member for axial adjustments, a socket in the proximate end of the cylinder for reception of the end of said wrench when the latter is advanced axially toward the cylinder end, and means for turning the wrench to angularly adjust the cylinder.

7. In a rotary printing machine of the multi-impression type comprising a plurality of printing couples arranged serially in the path of travel of the work and an inking apparatus operatively associated with each of the couples and forming with the latter a unit printing mechanism together with means for adjusting said units between relatively closed positions in which the said units lie contiguous to each other and relatively extended positions in which the said units are spaced apart on said path, drive means for said mechanisms consisting of a rotary splined shaft paralleling said path of travel, and a plurality of transmission elements splined to and movable axially on said shaft and operatively connected respectively with the unitary mechanisms, said unit mechanisms including a fixed terminal unit and movable terminal and intermediate units, means for locking the units together in the closed relation including a separate latch for connecting each unit to an immediately adjoining unit, mechanism operatively connected to the movable terminal unit for traversing that unit between the closed and extended positions, means for releasing the latch connecting the fixed unit with the adjoining intermediate unit and for simultaneously actuating the said traverse mechanism to move the said movable terminal unit toward the extended position together with the attached intermediate units, latch actuating means responsive to the movement of each intermediate unit into its extended position for detaching the unit from the adjoining unit, and means responsive to movement of the terminal unit into its extended position for interrupting the operation of the traverse mechanism.

8. A rotary printing machine according to claim 7, including means for reversing the operation of the traverse mechanism to move the terminal movable unit from the extended position into the closed position, and in said movement to successively move the intermediate units from their respective extended positions, and means responsive to the movement of the innermost intermediate unit into the closed position with respect to the fixed unit for interrupting the operation of the traverse mechanism for actuating the several latches to lock the units together in the closed positions.

9. In a rotary printing machine of the multi-impression type comprising a plurality of printing couples arranged serially in the path of travel of the work and an inking apparatus operatively associated with each of the couples and forming with the latter a unit printing mechanism together with means for adjusting said units between relatively closed positions in which the said units lie contiguous to each other and relatively extended positions in which the said units are spaced apart on said path, each said unit mechanism including a supporting frame of which one is fixed and the others are movable to afford the adjustments to the relatively open and closed positions, the said adjusting means comprising guide rails for the movable frames, a traverse screw paralleling said rails, means for operatively connecting the screw to the movable frame relatively remote from the fixed frame to move the said relatively remote frame on the rails, a fluid pressure actuated latch for detachably connecting the last named movable frame to the other movable frame for adjustment of the movable frames as a unit, including valve means for controlling the actuation of said latch, and means responsive to the movement of the said other movable frame on the rails into the extended position for actuating the latch to detach the frame and means for automatically actuating the connecting means to detach the said other movable frame when the latter has reached the extended position.

10. A rotary printing machine according to claim 9, wherein the latch comprises a bolt mounted on one of the said movable frames for longitudinal movement between advanced and retracted positions, and a keeper on the other of said movable frames arranged to clear the bolt when the latter is retracted and the frames move into the relatively closed relation, and to receive the bolt when the latter is then advanced to lock the frames in the said closed relation.

11. A rotary printing machine according to claim 10, wherein the said keeper has a conical socket and the bolt comprises a conical section fitting said socket.

12. A rotary printing machine according to claim 10 comprising a fluid pressure cylinder on the bolt-carrying frame arranged to receive an end of the bolt as a plunger, and means for applying fluid pressure to the cylinder to actuate the bolt.

13. A rotary printing machine according to claim 12, wherein the bolt extends across the frame and is operatively associated at each end with a fluid-pressure cylinder, and wherein further means is provided for applying fluid pressure to the cylinders, selectively, to move the bolt in the opposite directions and selectively into the extended and retracted positions.

14. In a rotary printing machine of the multi-impression type comprising a plurality of printing couples arranged serially in the path of travel of the work and an inking apparatus operatively associated with each of the couples and forming with the latter a unit printing mechanism together with means for adjusting said units between relatively closed positions in which the said units lie contiguous to each other and relatively extended positions in which the said units are spaced apart on said path, drive means for said mechanisms consisting of a rotary splined shaft paralleling said path of travel, and a plurality of transmission elements splined to and movable axially on said shaft and operatively connected respectively with the unitary mechanisms, one of the unit printing mechanisms being stationary and the others movable, mechanism for adjusting the movable units into the relatively closed and relatively extended positions selectively, said mechanisms including means for automatically interrupting the movement of each of the units when it moves into the said extended position.

15. A rotary printing machine according to claim 14, wherein the unit adjusting mechanism comprises devices for moving the unit relatively remote from the fixed unit into its relatively extended position, means for detachably connecting the movable units together for adjustment with the said remote unit as a unitary assembly, and means operable for automatically dropping each of the units from said assembly as it reaches its extended position.

References Cited in the file of this patent

UNITED STATES PATENTS

| Number | Name | Date |
| --- | --- | --- |
| 401,790 | Osborne | Apr. 23, 1899 |
| 626,270 | Chambon | June 6, 1899 |
| 1,098,060 | Spiller | May 26, 1914 |
| 1,134,697 | Pervilhac | Apr. 6, 1915 |
| 2,024,354 | Gurwick | Dec. 17, 1935 |
| 2,076,241 | Luehrs | Apr. 6, 1937 |
| 2,140,834 | Gazette | Dec. 20, 1938 |
| 2,163,035 | Grupe | June 20, 1939 |
| 2,183,045 | Presby | Dec. 12, 1939 |
| 2,625,878 | Baumgartner | Jan. 20, 1953 |